United States Patent [19]
Matsuo

[11] 3,887,151
[45] June 3, 1975

[54] APPARATUS AND METHOD FOR CONTROLLING THE INFLATION TIME AND APPLIED SNATCH FORCES ON A PARACHUTE

[75] Inventor: Jon T. Matsuo, El Centro, Calif.

[73] Assignee: The United States of America as represented by the Secretary of the Navy, Washington, D.C.

[22] Filed: Nov. 28, 1973

[21] Appl. No.: 419,851

[52] U.S. Cl. .............................................. 244/152
[51] Int. Cl. ........................................... B64d 17/34
[58] Field of Search ........... 244/150, 152, 149, 142, 244/151 R

[56] References Cited
UNITED STATES PATENTS

| | | | |
|---|---|---|---|
| 2,970,795 | 2/1961 | Gold | 244/152 X |
| 3,055,621 | 9/1962 | Martin | 244/142 |
| 3,278,142 | 10/1966 | Marshall | 244/149 |
| 3,599,908 | 8/1971 | Martin | 244/152 |
| 3,721,409 | 3/1973 | Matsuo et al. | 244/152 |
| 3,829,046 | 8/1974 | Matsuo et al. | 244/152 |

FOREIGN PATENTS OR APPLICATIONS

| | | | |
|---|---|---|---|
| 334,084 | 8/1930 | United Kingdom | 244/151 R |
| 1,051,709 | 12/1966 | United Kingdom | 244/149 |

Primary Examiner—Trygve M. Blix
Assistant Examiner—Barry L. Kelmachter
Attorney, Agent, or Firm—R. S. Sciascia; G. J. Rubens

[57] ABSTRACT

The inflation time of a parachute is controlled in a manner commensurate with its air speed of deployment by using a control line, sometimes referred to as an anti-squid line, connected to the canopy apex and the load, the length of the control line being foreshortened by a plurality of spaced, severable breakcords of the same or varying tensile strengths designed to part sequentially at predetermined airspeeds to increase the air-turn-around distance of the canopy and delay drag surface inflation. The breakcords in rupturing, gradually and consistently attenuate a portion of the applied snatch force on the control line.

4 Claims, 12 Drawing Figures

FIRST STAGE
(Very Low Airspeed)
0 to 75 Kts.

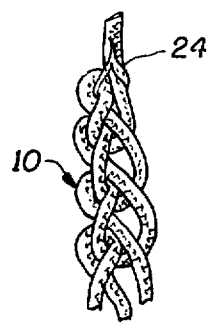
FIG. 1c
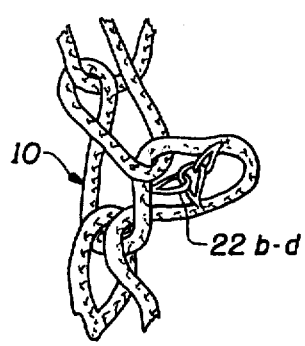
FIG. 1b
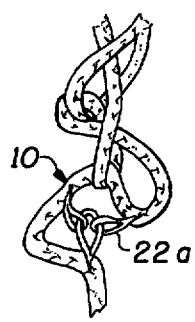
FIG. 1a
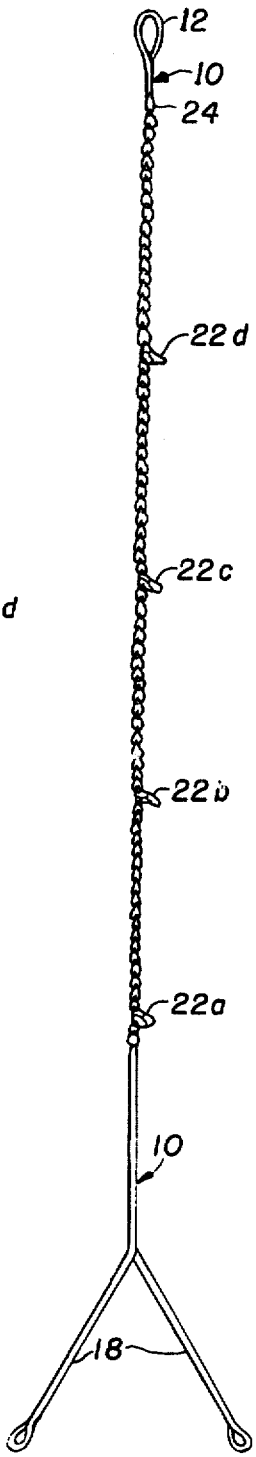
FIG. 1
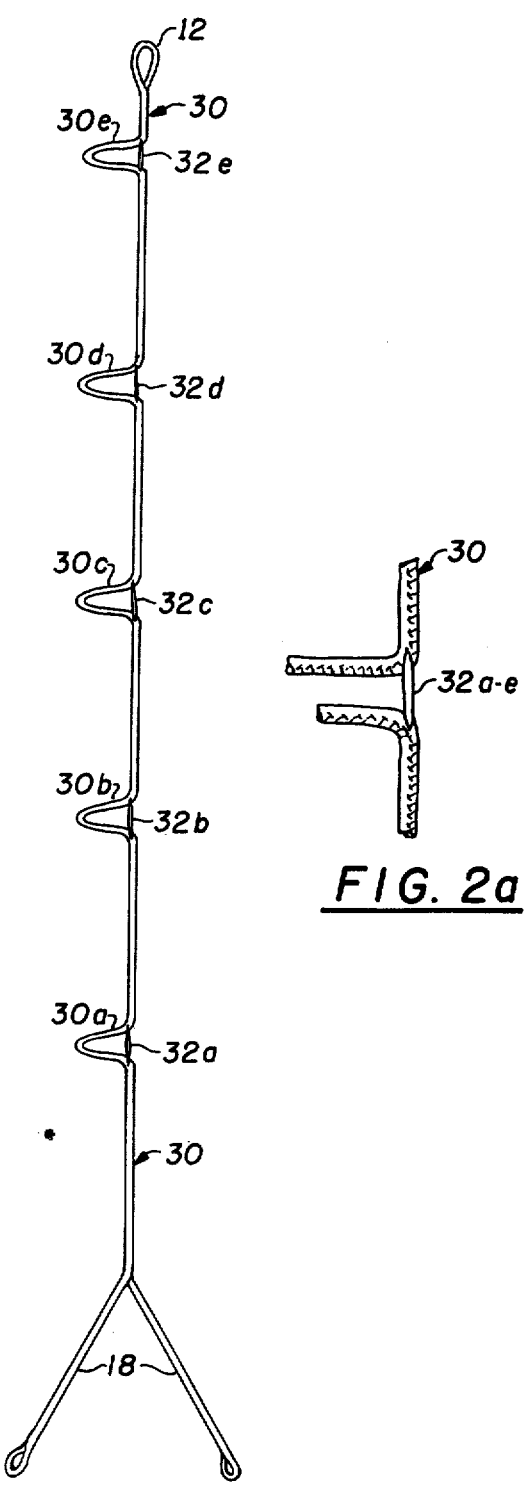
FIG. 2a
FIG. 2

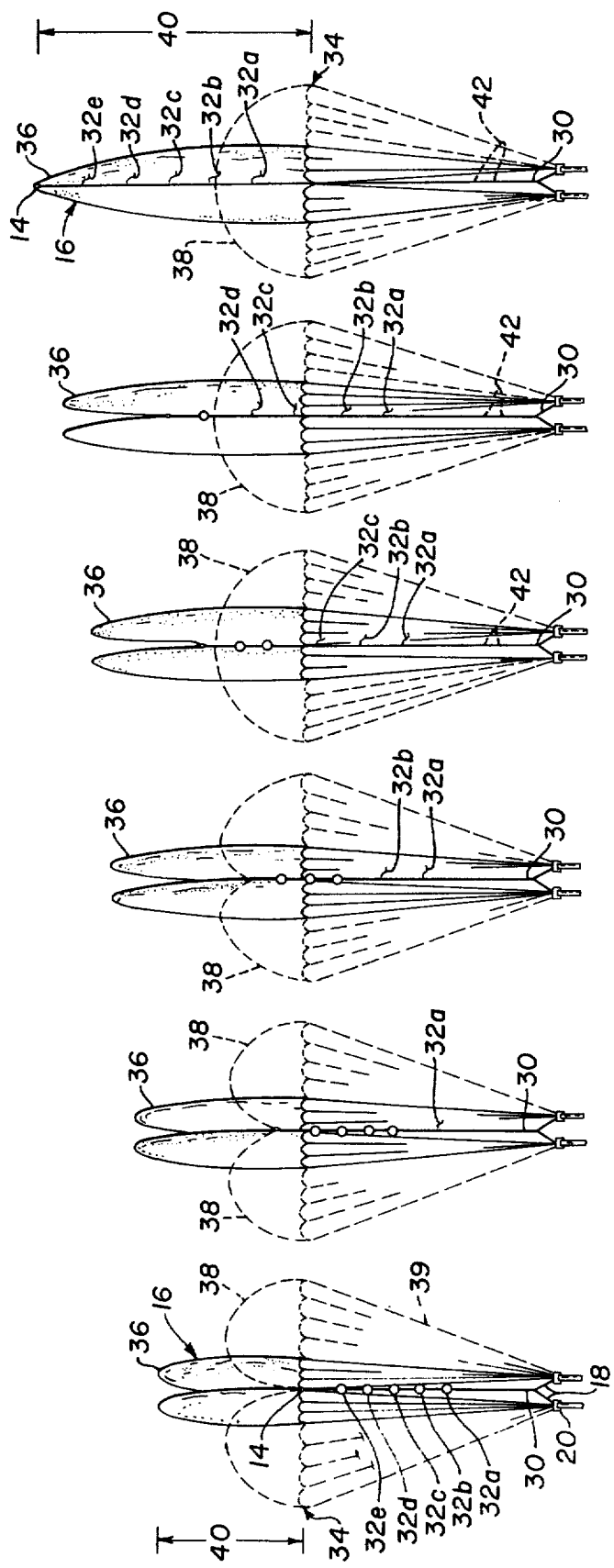

APPARATUS AND METHOD FOR CONTROLLING THE INFLATION TIME AND APPLIED SNATCH FORCES ON A PARACHUTE

BACKGROUND OF THE INVENTION

This invention relates to parachutes and more particularly to parachutes employing a variable-length control line for inflation time control.

It is well known that the deployment of trailing aerodynamic decelerators creates two forces known as a snatch force and an opening-shock force. The snatch force is a force of short duration imposed when the suspension lines are initially fully extended, and a differential velocity occurs between the rapid deceleration of the drag surface in relation to the slower acceleration of the load. The snatch force results in reducing this differential velocity to zero. The opening shock force closely follows the snatch force and occurs during inflation of the drag surface. Opening shock forces can be reduced considerably by reefing, venting and the use of control lines.

There are two types of parachute inflation-development aids that use a control line connecting the canopy apex to the harness end of the parachute. The control line is frequently also referred to as a pull down vent line, or an anti-squid line. The control line may be a permanent type, which is of fixed length; or an extendable length control line having a single stage, as is illustrated by U.S. Pat. No. 3,599,908, which permits squidding of the drag surface at high speed deployment.

The primary purpose of the control line or anti-squid line, is to decrease the inflation-development time, and in some cases to increase the effective drag area of the parachute canopy at low speed deployments.

In my prior U.S. Pat. No. 3,721,409, the drag force on a parachute canopy is controlled by reducing the projected area of the drag surface. This is accomplished by having a plurality of releasable sets of suspension lines connected to corresponding peripheral areas of the drag surface. This arrangement requires a more complex arrangement of suspension lines and involves additional bulk to contend with during packing of the parachute.

The present invention controls the inflation time of the drag surface with a single set of conventional suspension lines and a single extendable control line that variably changes or distorts the configuration of the drag surface in the squidded and inflated conditions.

SUMMARY OF THE INVENTION

A multi-stage inflation control of a parachute drag surface is uniquely accomplished in the present invention by using a variable length control line, or anti-squid line, extending from the canopy apex to the load. The total length of the control line is at least the combined length of the suspension lines and the stretched-out length of a relaxed drag surface. The control line is foreshortened by a plurality of breakcords of varying tensile strengths, each breakcord corresponding to a different predetermined maximum deployment airspeed.

The breakcords serve a dual function, namely, to vary the length of the control line to progressively provide a longer canopy air-turn-around distance thereby delaying canopy inflation. Delaying canopy inflation tends to attenuate the opening shock forces. And, secondly, the rupturing of the breakcords gradually consumes a portion of the snatch forces applied to the control at full line stretch condition of the canopy. It is estimated that the control line transmits at least one-third of the total force applied between the drag surface and the load.

STATEMENT OF THE OBJECTS OF INVENTION

It is a principal object of this invention to provide a parachute in which the inflation-development time can be varied in increments depending on the airspeed of deployment.

A further important object is to provide a means for attenuating the snatch force applied to a parachute at stretch-out condition; and a corollary object is to attenuate the shock forces during development of the drag surface.

Still other objects are to control the parachute inflation-development time by utilizing a conventional canopy with a variable length control line; and to provide such an inflation control in a simple and inexpensive manner.

Other objects, advantages and novel features of the invention will become apparent from the following detailed description of the invention when considered in conjunction with the accompanying drawings.

BRIEF DESCRIPTION OF THE DRAWINGS

FIG. 1 is an extended side elevation view of a novel five-stage, daisy-chained inflation/development control line employing the teachings of the invention prior to incorporation into a parachute canopy.

FIG. 1a is an enlarged view of the lowest breakcord connection in the daisy-chained multi-stage control line of FIG. 1.

FIG. 1b is an enlarged view of the three identical upper breakcord connections in the daisy-chained multi-stage control line of FIG. 1.

FIG. 1c is an enlarged view of the upper end of the daisy-chained control line disclosing the manner of how the daisy-chaining is started.

FIG. 2 is a modified novel control line similar to FIG. 1, but providing six stages and employing a straight control line.

FIG. 2a is an enlarged view of one of the five identical breakcord connections in the multi-stage control line of FIG. 2.

FIG. 3 is a side elevation view of a parachute canopy incorporating the novel control line of FIG. 2, illustrating a first-stage condition at very low airspeed development where none of the breakcords have been severed; the solid line canopy configuration being at initial lines-tretch condition, and the broken-line configuration being at full open condition.

FIG. 4 is a similar view as FIG. 3, showing the two respective configurations of the canopy in a second-stage condition at a low airspeed development, where only the first and lowest of the five illustrated breakcords has been broken by the applied snatch force.

FIG. 5 is a similar view as FIG. 4 showing the two respective canopy configurations in a third-stage condition at a relatively low airspeed deployment, where the lower two of the five illustrated breakcords have been broken sequentially by the applied match force.

FIG. 6 is a similar view as FIG. 5 showing the two respective canopy configurations in a fourth-stage condition at an intermediate airspeed deployment where the lower three of the five illustrated breakcords have been broken sequentially by the applied snatch force.

FIG. 7 is a similar view as FIG. 6 showing the two respective canopy configurations in a fifth-stage condition, at a medium airspeed deployment where the lower four of the five illustrated breakcords have been broken sequentially by the applied snatch force.

FIG. 8 is a similar view as FIG. 7 showing the two respective canopy configurations in a final sixth-stage condition at a high airspeed deployment, where all five of the illustrated breakcords have been broken sequentially by the applied snatch or inflation forces.

DESCRIPTION OF THE PREFERRED EMBODIMENT

Referring to the drawings where like reference numerals refer to similar parts throughout the drawings, there is shown in FIGS. 1 and 2 two different embodiments of the novel multi-stage inflation/development control line that provide the multi-stage canopy deployment illustrated in FIGS. 3 to 8. As is well known in the art, the control line serves as an inflation aid or as a means to prevent squidding of the canopy, and is sometimes referred to as a anti-squidding line. It is obvious that the number of stages that are designed into the control line are a function of the requirements of any specific parachute deployment, and in fact by way of illustration, the control line in FIG. 1 provides a five-stage canopy development, and that of FIG. 2 provides a six-stage canopy development.

In FIG. 1, control line 10 terminates at the upper end in a loop 12 adapted to be connected to the apex 14 of the drag surface 16 (FIG. 3), and terminates at the lower end in a bridle 18 adapted to be connected to the two riser connector links 20. The total effective length of control line 10 is at least the combined length of the suspension lines plus the stretched-out length of the drag surface, as illustrated in FIG. 8.

The length of control line 10 in FIG. 1 is foreshortened in two ways, firstly by employing four independent and spaced separable connecting elements such as breakcords 22a to 22d, and secondly, by daisy-chaining the control line between and in conjunction with the respective breakcords. The daisy-chaining of the control line is for the purpose of enabling the control line to be neatly and compactly stowed when packing the parachute and to minimize fouling of the control line during deployment. The daisy-chaining of the control line consists of forming a series of releasable slip knots commencing at the uppermost end of the control line at starting loop 24 (FIG. 1c), which loop does not function as a breakcord. The daisy-chaining of the control line continues downward until interrupted or snubbed by breakcord 22d which is the first breakcord to be formed but the last to be deployed, and thence down intermittently to breakcords 22c, 22b and finally terminating at breakcord 22a. Breakcord 22a is the last to be assembled, and the first to be broken.

As shown in FIGS. 1a and 1b, each breakcord may comprise an assembly of three loops or the like which snub the next-above daisy-chain knot and prevents unraveling until the latter is broken by the applied snatch or inflation forces.

To achieve a sequential parting of the breakcords to provide inflation control of the canopy in accordance with varying airspeeds of deployment, the breakcords are designed with varying tensile strengths, the weakest being 22a, the first breakcord to rupture during deployment and the strongest being 22d, the last breakcord to rupture. Control line 10 is designed to be generally 100 percent or more stronger than the strongest breakcord 22d.

In FIG. 2 a modified control line 30 is shown which differs from control line 10 in FIG. 1 in that an additional fifth-stage canopy is provided, and the excess foreshortened portions of the control line are not daisy-chained. Control line 30 is utilized in the six-stage parachute canopy illustrated in the various stages of deployment in FIGS. 3 to 8. To achieve a six-stage deployment control line 30 is provided with five breakcords 32a to 32e intermittently spaced along the control line, each breakcord foreshortening control line 30 by an amount in each of the respective loops 30a to 30e. Each breakcord may be of identical configuration and threaded through the control line at the appropriate points to provide the desired size loops, which may vary in length as will be later described.

As in control line 10 of FIG. 1, in control line 30 the breakcords 32a to 32e are each designed with a predetermined tensile strength corresponding to a given maximum parachute deployment airspeed. As will be more fully described with respect to operation of the canopy in FIGS. 3–8, in one representative application, the lowest breakcord 32a can be designed to break upon being subjected to an applied snatch force when the canopy is deployed at an airspeed of 75 kts to 115 kts, and the uppermost breakcord 32e may be designed to break upon the deployment speed of 250 kts and above, with the intermediate breakcords 32b to 32d appropriately graduated in tensile strength for the deployment speeds therebetween. As in control line 10, control line 30 is designed generally to be about 100 or more percent stronger than the strongest breakcord, i.e. 32e.

The effects of the novel variable length control line 30 on the deployment of the parachute canopy 34 is best described in reference to FIGS. 3 to 8.

FIG. 3 illustrates the first-stage of a six-stage canopy deployment at a very low airspeed (i.e. 0 to 75 kts). Each of the breakcords 32a to 32e, and the equivalent foreshortened length of control line by daisy-chaining or the loops in FIG. 2, both being represented in the figures by a circle. Since the deployment speed in FIG. 3 is below that which will create a snatch force of a magnitude to rupture breakcord 32a, it remains intact as do all the remaining stronger breakcords in control line 30. The solid line configuration of the drag surface 36 illustrates a squidded condition at the instant of full-line stretch just prior to commencement of inflation, while the broken-line configuration 38 illustrates the full-open inflated condition.

It should be noted in FIG. 3 that the foreshortened condition of control line 30 causes a deformation, in the shape of a dimple at the apex of the drag surface, in both squidded and inflated conditions. The effective length of control line 30 in FIG. 3 is about the same length as suspension lines 39.

The length 40 of the drag surface 36 in its squidded configuration is called an "air-turn-around distance," which dimension has a direct bearing in determining of inflation time or development time of the canopy. That is, the shorter the air-turn-around distance, the quicker the canopy inflates.

In FIG. 3 the initial deployment of the parachute in its first-stage at a very low speed of 0 to 75 kts did not generate sufficient snatch or inflation force to part lowest breakcord 32a. As the air-turn-around distance is at a minimum value, the drag surface became fully inflated in condition 38 in the shortest inflation time. The diameter of the distorted drag surface in fully inflated condition 38 is slightly greater than it will be when the drag surface is less distorted.

If the parachute is initially deployed at a low airspeed (i.e. 75 to 115 kts), being a second-stage deployment in FIG. 4, the generated snatch or inflation force is sufficient only to part the first breakcord 32a, the parted condition being represented by a short straight line. Parting of breakcord 32a causes the release of corresponding loop 30a, and the equivalent lengthening of control line 30. The remaining breakcords 32b to 32e are unaffected and remain integral. The parting of breakcord 32a dissipates a portion of the applied snatch force. The lengthening of control line 30 increases the air-turn-around distance 40, causing a time delay, or an increase in the canopy inflation time, reducing the shock force to which the canopy would otherwise be subjected.

Should the parachute be initially deployed at a relatively low speed (i.e., 115 to 160 kts), being a third-stage deployment in FIG. 5, the generated snatch or inflation forces are of sufficient magnitude to part sequentially both breakcords 32a and 32b. This parting action of the breakcords attenuates a portion of the snatch force. As illustrated, the length of control 30 is extended the equivalent of loops 30a and 30b, which causes a corresponding increase in the air-turn-around distance 40. The additional delay, provides a corresponding increase in the inflation time of the canopy. It should be noted in FIGS. 3 to 5, that the incremental increase in the length of the control line decreases the amount of the deformation of the drag surface, both in the squidded and full inflation conditions.

FIG. 6 illustrates the parachute deployed at an intermediate airspeed (i.e. 190 to 210 kts), representing a fourth-stage deployment. The generated snatch or inflation forces are sufficient to snap breakcords 32a, 32b and 32c, sequentially releasing the respective control line loops 30a to 30c.

The increase in the effective length of the control line has increased the air-turn-around distance to further delay the development time in canopy inflation. As the effective length of the control line is now greater than the combined length of the suspension lines and the radius of the canopy, the full inflated canopy 38 is no longer distorted. The excess length of control line in the inflated condition is represented by loop 42.

FIG. 7 represents the fifth-stage canopy in which the parachute is deployed at a medium airspeed (i.e. 210 to 250 kts). Breakcords 32a to 32d have been sequentially broken and their respective control line loops 30a to 30d have been released. The air-turn-around distance of the squidded drag surface 36 has further increased providing a still greater development time of the inflated canopy. The length of excess control line loop 42 is correspondingly longer.

FIG. 8 represents the sixth and final-stage of the canopy when deployed at a high airspeed of above 250 kts. All of the five breakcords 32a to 32e are sequentially broken intermittently between the release of the corresponding control line loops 30a to 30e. The sequential parting of the breakcords and release of the corresponding loops have absorbed a substantial portion of the applied snatch forces, and the air-turn-about distance is maximum, providing an appropriate development time of the inflated canopy. Neither the squidded condition 36, or the full inflated canopy condition 38, are distorted by the control line 30 in either condition.

Thus, FIGS. 3 to 8 illustrate the various stages of deployment that a six-stage parachute can assume depending on the deployment speeds. The number of stages and the respective speed range designed are only illustrative, and both can be varied depending on any specific requirement. It is obvious that a similar result could be achieved by using control line 10 of FIG. 1.

The novel multi-stage control line, or anti-squid line, enables a parachute to be safely deployed at a plurality of different airspeeds in a safe, simple and expeditious manner.

The invention provides a multi-stage control line for attenuating the applied snatch forces, as well as reducing the opening shock forces, by incrementally and consistently controlling the inflation time of the drag surface.

At a very low deployment first-stage airspeed, the squidded condition of the drag surface is greatly distorted by the novel control line to provide the smallest air-turn-around distance, enabling the drag surface to inflate in the shortest period of time. On the other end of the deployment spectrum, namely the sixth-stage high airspeed deployment, the full extended length of the novel control line provides a maximum air-turn-around distance, disrupting the inflation-development phenomena to the greatest extent so that a maximum inflation-development time is achieved to ensure a safe deployment.

Obviously many modifications and variations of the present invention are possible in the light of the above teachings. It is therefore to be understood that within the scope of the appended claims the invention may be practiced otherwise than as specifically described.

What is claimed is:

1. Parachute apparatus comprising:
   a canopy having a drag surface and a single set of a plurality of suspension lines of fixed length connected thereto;
   a vertical control line connected to both the canopy apex and a load;
   the total effective length of said control line extending for at least the combined length of the suspension lines and the canopy drag surface when in a full stretched-out condition;
   releasable means for foreshortening said control line in a plurality of predetermined increments to control the air-turn-around distance in said drag surface in direct relation to a plurality of different predetermined speeds of parachute deployment; said releasable means being breakcords of different tensile strengths.

2. The parachute apparatus of claim 1 wherein portions of said control line between said breakcords are daisy-chained.

3. Anti-squid means for a parachute canopy comprising:
   a control line;
   attachment means at both ends of said line for connecting to the apex of said canopy and to a load, respectively;

a plurality of means intermittently located along said line for foreshortening the length of the control line;

said foreshortening means being releasable upon the application of a predetermined tensile force on said line;

each foreshortening means operable by different values of tensile forces;

whereby a sequential lengthening of said line can be achieved depending on the applied tensile forces.

4. The anti-squid line of claim 3 wherein said foreshortening means are breakcords.

* * * * *